July 8, 1958

J. L. CASSELL 2,842,758

DETECTOR UNIT

Filed March 5, 1954

INVENTOR.
JOSEPH L. CASSELL

BY

*Philip S. McBean*
ATTORNEY

July 8, 1958     J. L. CASSELL     2,842,758
DETECTOR UNIT

Filed March 5, 1954     4 Sheets-Sheet 2

INVENTOR.
JOSEPH. L. CASSELL

BY Philip S. Wilson
ATTORNEY

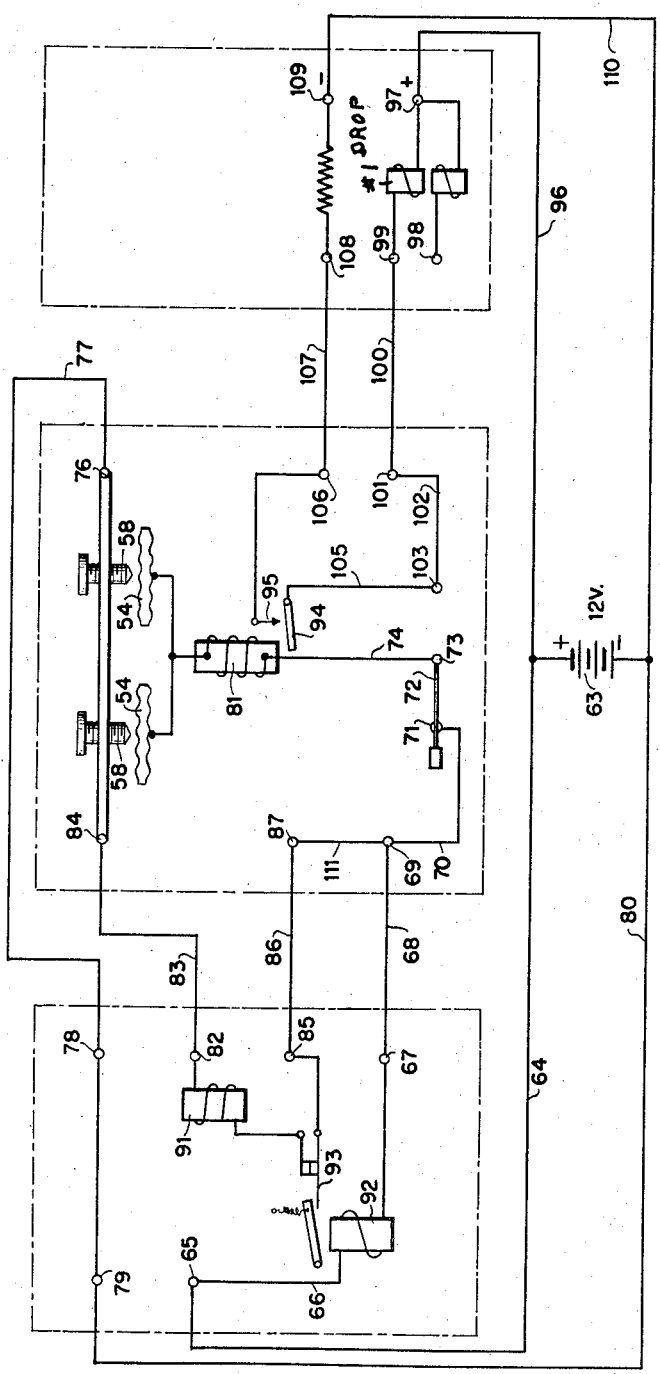

United States Patent Office 2,842,758
Patented July 8, 1958

2,842,758

DETECTOR UNIT

Joseph L. Cassell, New York, N. Y., assignor to Automatic Fire Alarm Company, New York, N. Y., a corporation of New York Application March 5, 1954, Serial No. 414,442

4 Claims. (Cl. 340—229)

The invention herein disclosed relates to the detector units used in so-called aero tubing fire alarm systems.

These units consist usually of switch mechanisms actuated by diaphragms located at the ends of the tubing, and valve mechanism for testing the tubing and the action of the diaphragms and switch mechanisms, all protected within a wall box accessible only to authorized inspectors and servicemen.

Objects of the present invention are to thoroughly safeguard these parts and mechanisms, to avoid leaks at the valves and diaphragms and to assure proper handling and sequence of operations in the inspection and testing of the apparatus.

Specifically it is an object of the invention to insure that the system will be instantly put on test so as not to send in a false alarm when the box is opened, and to automatically return the system to normal operation when the box is closed, and further to make certain that the box will not be closed until the testing equipment has first been set back to normal operation.

In the accomplishment of these objects a switch for shifting from normal to test and from test back to normal operation, is provided, operable by opening and closing movements of the door, and an interlock for preventing closing of the door is provided, arranged to be held back by the test valves but only when these valves have been restored to normal operating position.

The test valves are of novel construction, free of sliding or rotatively engaging valve parts so as to avoid wearing and leakage, and the diaphragms are mounted on one-piece bases, free of screw or plug-closed openings such as have heretofore occasioned leaks in the system.

The invention further involves certain improvements and modifications to circuits necessary to incorporate the protective switch mechanism in the system.

Other novel features of the invention and further desirable objects accomplished are set forth and will appear in the course of the following specification.

The drawings accompanying and forming part of the specification illustrate a present practical embodiment of the invention. Structure, however, may be modified and changed as regards the immediate illustration, all within the true intent and scope of the invention as hereinafter defined and claimed.

Fig. 1 in the drawings is a front elevation of one of the new detector units showing the box opened and the automatic change-over switch released by the cover and converting the electrical system from normal to test operation;

Fig. 8 is a comparative diagram to show the usual or present day circuit connections.

Figure 1:
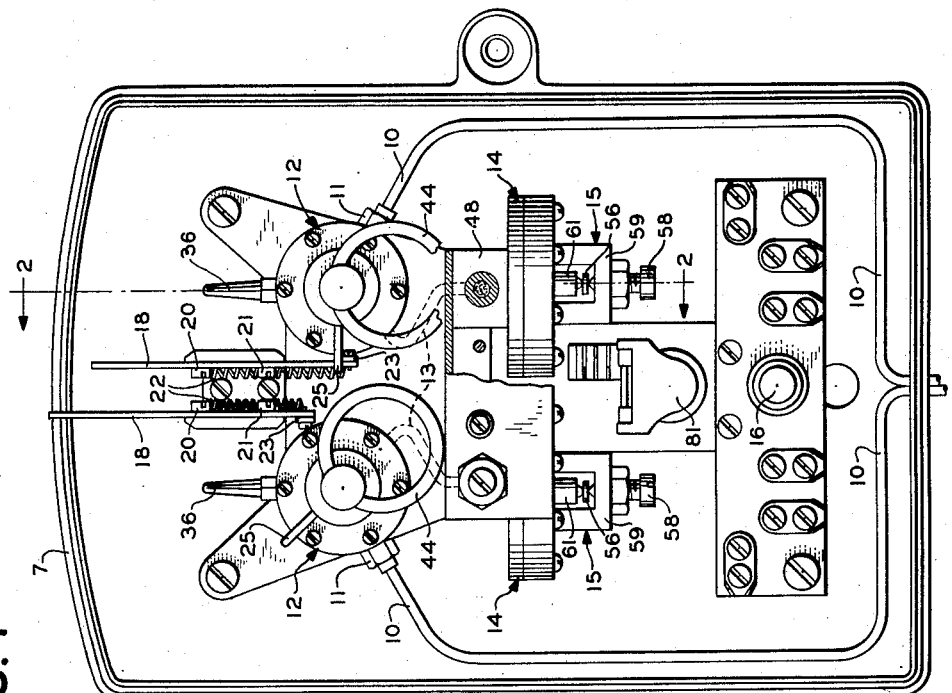
Fig. 1a is a broken sectional detail showing the cover of the box closed and the projection on the inside of the cover holding the switch in the normal operative position.

In the general view, Fig. 1, a wall box is indicated at 7, having a hinged cover 8 which can be secured or released by a special screw 9 operable only by a wrench key issued to authorized servicemen and inspectors.

The ends of the aero tubing 10 are shown brought into the box and connected at 11 with the two test valves 12. From the back of these valves connections 13 lead to the diaphragm chambers at 14. The signal switches actuated by the diaphragms are indicated at 15.

Figure 1A:
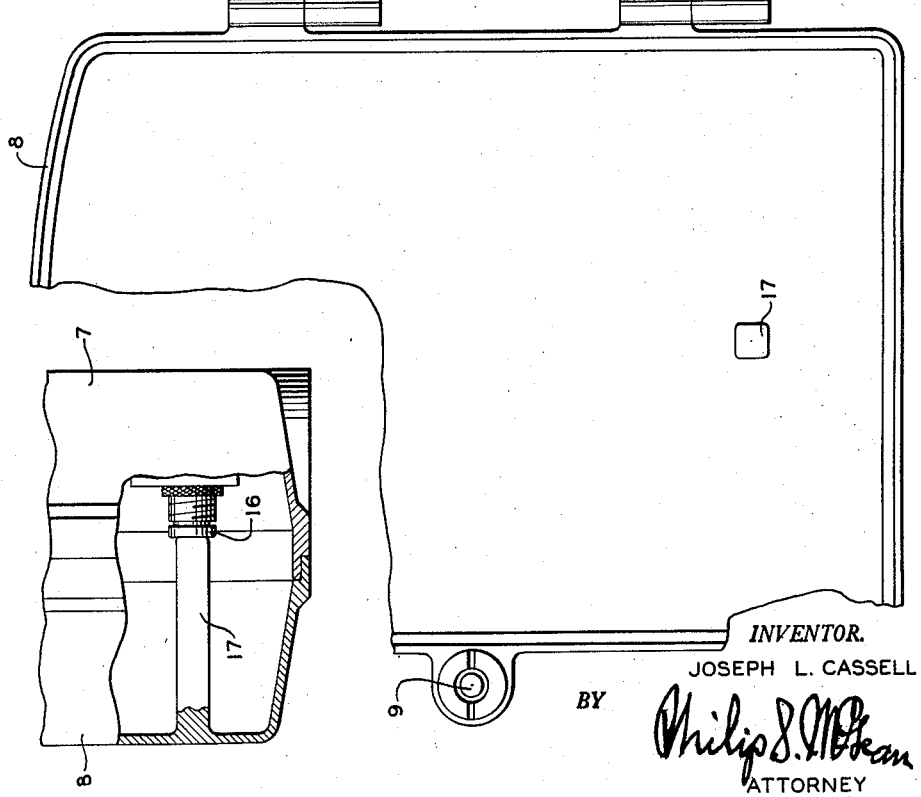

The change-over switch for holding the system on normal signal operation when the box is closed and for automatically shifting over to testing circuit operation when the box is opened, is shown at 16 in Figs. 1 and 1a, in the form of a push-button switch mounted on the back of the box, in position to be engaged and actuated by the stud 17 projecting from the inner face of the cover. This is a spring actuated switch connected and arranged to close the normal operating circuits when the push-button is forced inwardly against the spring tension of the switch by closing of the door, and to open these circuits and close the testing circuit or circuits when pressure on the button is released on the opening of the cover.

The stops for preventing closing of the cover until the test valves have been restored to normal operation position, are indicated at 18 in the form of slides longitudinally slotted at 19 and thereby guided over screw pins 20, 21, these slides being projected by springs 22 to extend over the edge of the box, and being held retracted by triggers or latches 23 pivoted on the inner ends of the slides, at 24, in position to catch behind the pins 25 projecting radially from the rotatable stem portions 26 of the test valves.

Figure 3:
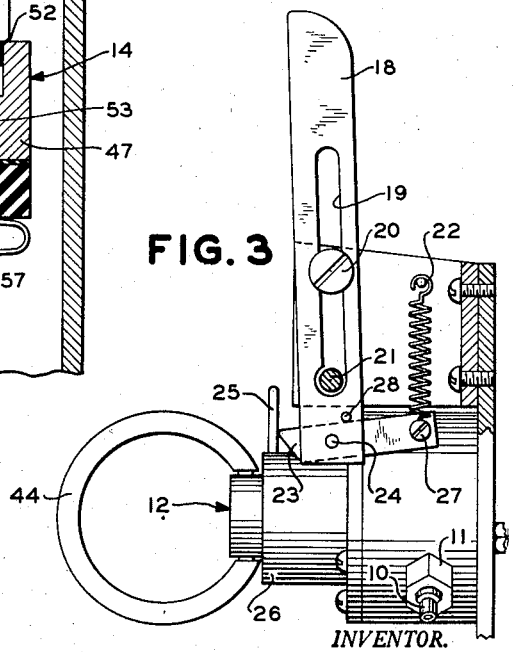
Fig. 3 is a further enlarged broken sectional view showing one of the test valves turned to a testing position, releasing the cover stop associated therewith.
Figure 6:
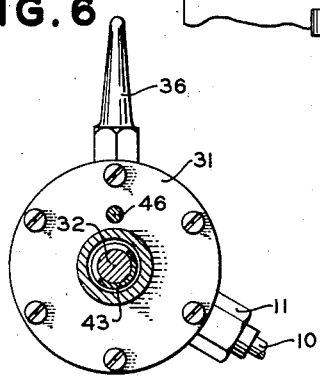
Fig. 6 is a cross-sectional detail on substantially the plane of line 6—6 of Fig. 2.

The slide projecting springs 22 are shown connected at 27, Fig. 3, with the free ends of the triggers 23 to serve the double purpose of projecting the slides and of rocking the triggers on their pivots so that the inclined latching ends of these elements may pass behind the holding pins 25 and then hold thereagainst if the valves are in the holding position, as shown at the right in Fig. 1. Stop lugs or pins 28 on the slides limit the extent of rocking movement of the latches or triggers 23 under pull of the springs 22.

In the illustration the triggers, latch levers or catches 23 will engage the pins 25 to hold the slides retracted, clear of the edge of the box, only when the test valves are in the normal operating position, as shown at the right in Fig. 1. In any other position of the test valves the slides will not be held back and will project to prevent closing of the cover, as shown at the left in Fig. 1. It follows, therefore, that both test valves must be restored to normal operating position and both slides associated with those valves be forced back into the box and caught by the retainers 25 before the cover can be closed and hence before the change-over switch will be operated by the cover to restore the system to normal operation.

The test valves are shown as made up each of a body or case 29 having a cylindrical chamber 30 in the front of the same, closed over by cover 31 in which a valve stem 32 is rotatably and slidingly mounted.

Three ports are entered in the back of the chamber 30, one designated 33 connected with the end of the aero tube 10, a second one, 34, providing entrance to the tube connection 13, and the third, 35, connected with the test spout or nozzle 36 on the side of the valve casing.

These ports are equally spaced in respect to the center of rotation of the valve stem and are each surrounded by a small circular O-ring 37. A limp diaphragm 38 overlies these three ports and is held sealed at its rim against a larger O-ring 39 by a clamping ring 40 secured in the chamber by the cover.

The diaphragm 38 is pressed into engagement with any one of the three port sealing rings 37 by a circular pad 41 of slightly larger size than these O-rings, on the end of a radial arm 42 at the inner end of the valve stem 32.

Figure 2:
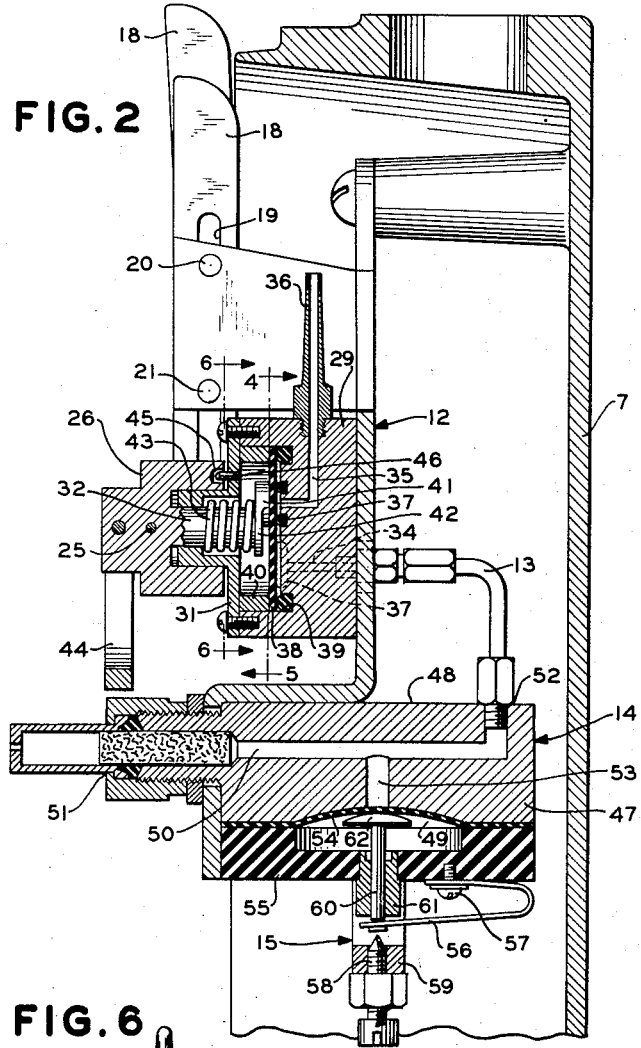
Fig. 2 is an enlarged broken sectional view on substantially the line 2—2 of Fig. 1, through one of the diaphragm chambers and test valves, and showing one cover stop projected and the other retracted, the same as indicated in Fig. 1.
Figure 4:
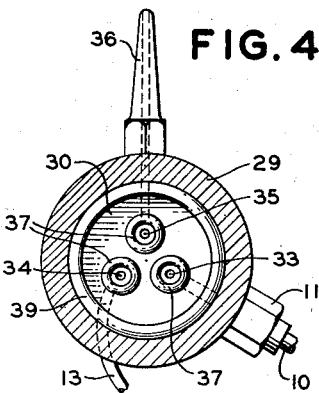
Figs. 4 and 5 are cross-sectional views of one of the test valves taken on substantially the plane of line 4—5, Fig. 2, looking in opposite directions in the two views.
Figure 5:
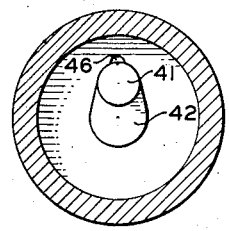

A spring 43 about the inner end of the valve stem and between the radial arm 42 and the inner face of the cover, serves to hold the valve stem inwardly with the pad 41 pressing the diaphragm firmly over the O-ring surrounding the valve port with which the radial arm is aligned and which, in Fig. 2, is the port 35 leading to the test spout 36. Hence in this particular situation the test spout is closed off and the other two ports are open, providing free communication between the end of the aero tube and the tubing extending to the switch actuating diaphragm.

Convenient operation of the test valves is afforded by rings 44 engaged with the head portions 26 of the valve stems. Fig. 2 shows how the spring 43 holds the valve stem inwardly with the pad at the inner end of the same pressed solidly over a valve port seal and with an indexing socket 45 on the head engaged over an indexing pin 46 on the cover.

In this particular illustration three indexing sockets 45 are provided in the head to locate and hold the valve stem in position with the pad closing one of the three ports in the valve casing.

To unlock and turn the valve stem to any other position, it is necessary to first pull out the valve stem sufficiently to disengage the indexing elements 45, 46. This movement withdraws the pad from engagement with the diaphragm. The stem may then be turned to any one of the other valve positions and again be locked by engagement of the indexing elements at that location.

Thus the test valves are locked in each of the test or operating positions and cannot be turned until they are pulled outward and unlocked by disengagement of the indexing detents. When turned to a new location the valve closing action will be a straight line movement closing the diaphragm over the valve port O-ring.

With this construction, therefore, the valve is closed leak-tight in each position and the change from one position to another is effected without rubbing or wiping engagement of valve parts.

The rings 44 afford proper grip of the fingers for the pulling and turning valve movements and for indexing the valve from one position to aother.

To avoid the possibility of leakage at the working diaphragms, the base structure for such diaphragms is shown as consisting in each case of a single disc 47 having an integral rib or ridge 48 across the top of the same, the lower face of the disc being concaved at 49 to form the arched roof of the diaphragm chamber and the ridge portion being bored in through the front end, at 50, to take the pressure compensating "leak" 51, and bored down from the top at the opposite end, at 52, to receive the pressure connection 13, and bored up from the bottom, at 53, into the cross channel 50 to admit pressure to the diaphragm.

The diaphragm 54, preferably of limp material, is shown clamped airtight against the rim of the base member by an annular member 55 of insulating material, to form the insulating base for the switch contacts.

In the illustration the switch contacts are shown provided by a return bent spring 56 secured to the insulating base plate 55, at 57, and a pointed contact screw 58 adjustably secured in an arched bracket 59 mounted on the base.

The free end of contact spring 56 is engaged at the inner side by the stem of a plunger 60 operating freely in a guide 61 and having an arched head 62 engaging the center of the diaphragm and normally holding it pressed upward, closing the central passage 53 in the roof of the chamber.

In this construction, with the diaphragm chambers normally closed, the aero tubing is kept in a more sensitive state since there are no cushions of air at the ends of the tubing to absorb the effects of expansion of air in the tubing. The diaphragms are therefore ready to act to close the switches immediately upon expansion of air in the tubing caused by sudden rise of temperature.

The test valves illustrated provide for all the usual or special testing of the equipment and they can be relied upon to maintain leakproof conditions, since there is no wearing of the valve parts. Similarly, the switch actuating diaphragms can be relied upon to maintain their sensitive and airtight condition.

The automatic change-over switch and the interlock between the door stops and test valves assures that upon opening the door the system will be switched over from normal to test and that the door may not again be closed until the test valves have been restored to normal operating position.

The soft, loose and flexible character of the limp diaphragms 54 enables the relatively light switch springs 56 to hold these diaphragms 54 arched upward against the domed roofs of the expansion chambers, covering and closing the ends of ports 53, thus eliminating cavities at the ends of the aero tubing under normal conditions. The absence of such cavities at the ends of the tubing assures that the "leak" time will always be the same, a desirable condition heretofore unattainable with the use of metallic diaphragms which, because of their relatively stiff and non-conforming character, cannot act as close-fitting covers to seal off the ends of the tubing.

Figure 7:
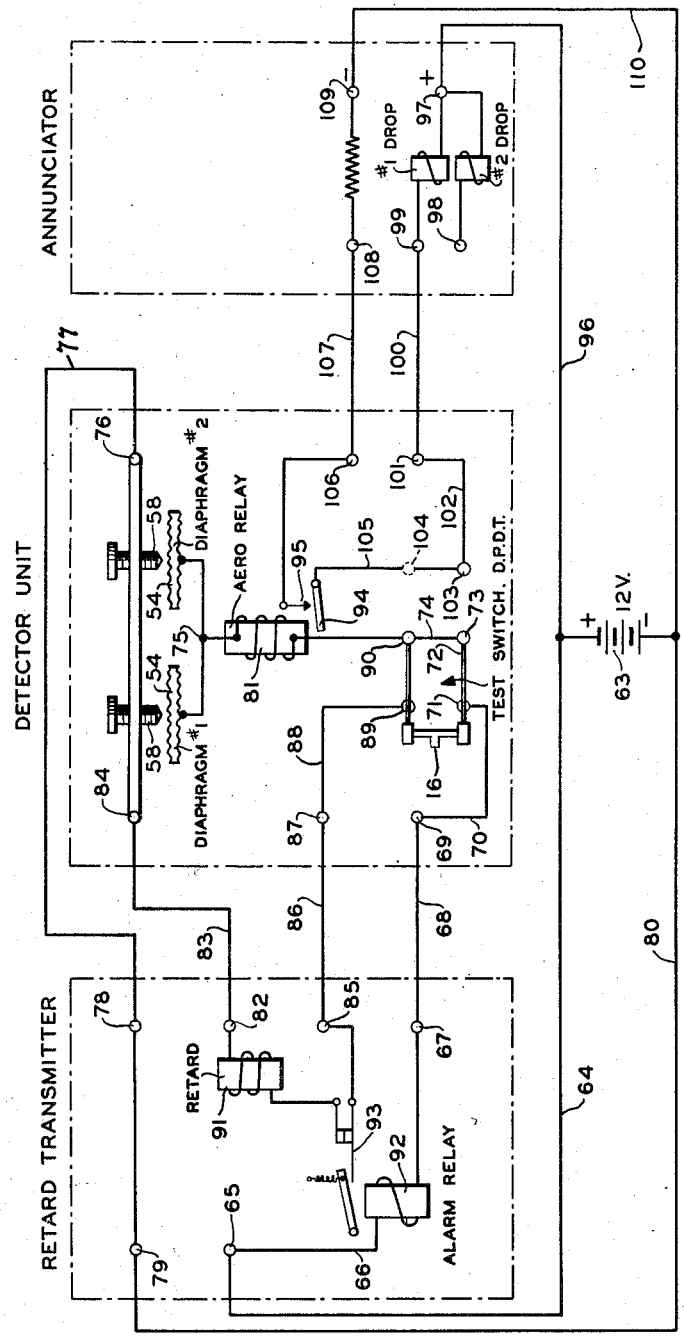
Fig. 7 is a wiring diagram of the present invention.

The changes needed to incorporate the protective switch mechanism in and combine it with the circuits customarily employed with aero tubing systems are illustrated schematically in Fig. 7, where the new detector unit is shown connected with the usual retard transmitter at one side and with the floor or area annunciator at the other side.

When, for example, pressure in the aero tubing caused by sudden rise of temperature from a fire distends diaphragm 54 and closes circuit at the switch point 58, current flow may be traced as follows:

From battery 63 through wire 64 to terminal 65 of retard transmitter and wiring 66 through the alarm relay to terminal 67, then by connecting wiring 68 to terminal 69 of the detector unit and wiring 70 to contact 71 of one side of the double pole, double throw change-over switch 16 and movable switch blade or contact 72, contact 73 and wiring 74 to aero relay and then by wiring 75 to diaphragm switch, then closed at 58, terminal 76, wiring 77 back to terminal 78 of the retard transmitter and thence by terminal 79 and return wiring 80 back to the battery.

This, in effect, shunts the low resistance aero relay 81 across the house loops 82, 83, 84, 76, 77, 78 and 85, 86, contact 87, connection 88, switch point 89 at other side of the double pole switch 16, contact 90, wire 74, contacts 73, 72, 71, wire 70, contact 69 and wire 68 to transmitter terminal 67.

This robs the retard 91 of current and enables attraction of the armature of alarm relay 92 which opens contacts at 93, completely cutting off the retard current.

The retard then runs through a complete cycle, in the end sending in a fire alarm signal to the central office.

As the same time contacts 94, 95 of the aero relay 81 close, allowing current to pick up drop No. 1 of the annunciator through connection 96 from the battery to terminal 97, No. 1 drop 15, terminal 99, connection 100, terminal 101 of the aero unit, wiring 102, contacts 103, 104 and connection 105 through armature 94, contact 95, terminal 106, connection 107, terminals 108 and 109 and return 110 to opposite side of the battery.

In the diagram the changes over the usual circuit connections are indicated. Thus in the usual system the terminals 69 and 87 of the detector unit are connected together. In the new detector this connection is omitted. Also, in the new unit the switch is of the double pole, double throw type having extra contacts at 89, 90 and 104 and a connection indicated by line 88 is extended from the terminal 87 to switch contact 89.

In the diagram the switch is shown in the normal operating position, with the door closed. When the door is opened the switch will be automatically thrown to the opposite position to connect contact 73 with 103 and contact 90 with 104.

Under the older systems now in use, as indicated in Fig. 8, the inspector, when he makes a periodic test, mechanically blocks the retard transmitter so that accidental fire signals will not be sent in to the central office and, when he opens the door of the box, throws a single pole test switch to close circuit across contacts 73 and 103.

When making these tests the inspector pumps up pressure through nozzles 36 to distend the diaphragms and close circuits through the diaphragm switches at 56, 58.

Current will then flow from the battery through line 96 and No. 1 drop 15 and through lines 100, 102, contact 103, movable switch contact 72 and line 74, through aero relay 81 and diaphragm switch contact 58 and connections 77, 78, 79, 80, back to the battery.

Since the circuit is open between switch contacts 71, 73 at this time, the retard transmitter will not be affected.

Mechanically blocking the transmitter is necessary in the older systems to prevent the transmitter from sending false fire alarm signals to the central office, if and when the inspector may forget or neglect to throw the switch to test position.

With the new system shown in Fig. 7, it is no longer necessary to mechanically block the retard transmitter because when the inspector opens the door the change-over switch 16 automatically switches to test position.

At the same time the connection between switch contacts 71 and 73 and between 89 and 90 open up and this opens up the house loops 85, 86, 87, 88, 89, 90, 73, 72, 71, 70, 69, 68 and 67.

This drops the retard unit to its first, trouble position.

If the inspector should then forget or fail to close the aero unit door, he would not be able to wind the trouble side of the retard transmitter before leaving the building.

The electrical and mechanical advantages of the new aero unit over the old units may be summarized as follows:

The change-over switch 16 automatically throws to test position when the door is opened. This makes it unnecessary to mechanically block the transmitter, a practice that has led to mechanical damage to the transmitter mechanism.

The building remains fully protected except as to the aero circuit under actual test. The inspector, however, being close at hand, could in any event send in an alarm if a fire then occurred in the area under test.

The rest of the circuits in the building would still then be in shape to send in fire signals in the normal way.

If an inspector should fail to close one of the aero units, leaving it out of service and under test, he would not be able to wind his transmitter, the last thing he must do before leaving the building.

A further advantage of the supervised change-over switch is that if anything should happen to the switch, mechanically or electrically, when the door of the unit is being closed, the inspector will not be able to wind the transmitter on leaving the building.

The invention provides then, an automatic change-over switch in combination with a tamper switch, the latter acting as a check on the inspector and on possible mechanical and electrical failure of the switch.

What is claimed is:

1. Aero detector unit comprising in combination with aero tubing having diaphragms at opposite ends of same, signal switches operable by said diaphragms and test valves for testing the aero connections, change-over switch mechanism for converting the unit from normal operating to test conditions and back to normal operating, an enclosure for said diaphragms, signal switches, test valves and change-over switch mechanism and including a door openable to afford access to said parts and closeable to protect said parts, said change-over switch mechanism including a spring projected switch button in the enclosure arranged to stand in the projected relation when the switch mechanism is in the on test position and to be depressed when said switch mechanism is in the normal operating position, an abutment on the cover arranged to depress said switch button when the cover is closed and to leave the switch button free to project when the cover is opened, stops for preventing closing of the cover retractably mounted in the enclosure and retainers for said stops positioned by said test valves when said valves are in normal operating position to hold the stops in retracted relation and whereby on opening said cover said switch mechanism will be automatically placed in the on test position and said cover may not be closed to return the change-over switch mechanism to normal operation until the test valves have first been returned to the normal operating position required to hold the cover stops in the retracted relation.

2. Aero detector unit comprising in combination with aero tubing having diaphragms at opposite ends of same, signal switches operable by said diaphragms and test valves for testing the aero connections, change-over switch mechanism for converting the unit from normal operating to test conditions and back to normal operating, an enclosure for said diaphragms, signal switches, test valves and change-over switch mechanism and including a door openable to afford access to said parts and closeable to protect said parts, said change-over switch mechanism including a spring projected switch button in the enclosure arranged to stand in the projected relation when the switch mechanism is in the on test position and to be depressed when said switch mechanism is in the normal operating position, an abutment on the cover arranged to depress said switch button when the cover is closed and to leave the switch button free to project when the cover is opened, stops for preventing closing of the cover retractably mounted in the enclosure and retainers for said stops positioned by said test valves when said valves are in normal operating position to hold the stops in retracted relation and whereby on opening said cover said switch mechanism will be automatically placed in the on test position and said cover may not be closed to return the change-over switch mechanism to normal operation until the test valves have first been returned to the normal operating position required to hold the cover stops in the retracted relation, said stops including bars mounted to project over the edge of the enclosure, springs for so projecting said bars, latches pivoted on said bars and connected with said springs, said test valves having rotatable stems and projections on said stems positioned to extend within the range of engagement by said spring impelled latches when said valve stems are in the normal operating position.

3. Aero detector unit comprising in combination with aero tubing having diaphragms at opposite ends of same, signal switches operable by said diaphragms and test valves for testing the aero connections, change-over switch mechanism for converting the unit from normal operating to test conditions and back to normal operating, an enclosure for said diaphragms, signal switches, test valves and change-over switch mechanism and including a door openable to afford access to said parts and closeable to protect said parts, said change-over switch mechanism including a spring projected switch button in the enclosure arranged to stand in the projected relation when the switch mechanism is in the on test position and to be depressed when said switch mechanism is in the normal operating position, an abutment on the cover arranged to depress said switch button when the cover is closed and to leave the switch button free to project when the cover is opened, stops for preventing closing of the cover retractably mounted in the enclosure and retainers for said stops positioned by said test valves when said valves are in normal operating position to hold the stops in retracted relation and whereby on opening said cover said switch mechanism will be automatically placed in the on test position and said cover may not be closed to return the change-over switch mechanism to normal operation until the test valves have first been returned to the normal operating position required to hold the cover stops in the retracted relation, said test valves including rotatably and slidably mounted valve handles having holding abutments and the stops having elements engageable in back of said holding abutments and whereby upon longitudinal and rotary motion of the valve handles said holding abutments will be shifted to release said stops.

4. Aero detector unit comprising a box having a movable cover, elements of testing and operating circuits in said box, a double pole, double throw switch in said box for connecting the elements of the testing circuit when the box is open and for connecting the elements of the operating circuit when the box is closed, means for throwing said switch to the testing circuit position when the cover is opened, means operable by the cover for effecting shifting of the switch to the operating circuit position when the cover is closed, and means under control of said switch for initiating a tamper signal if said door is left open and for instituting a supervisory signal if said switch should become ineffective when the door is closed.

References Cited in the file of this patent

UNITED STATES PATENTS

| | | |
|---|---|---|
| 410,683 | Carhart | Sept. 10, 1889 |
| 891,743 | Smith | June 23, 1908 |
| 1,073,335 | Doughty | Sept. 16, 1913 |
| 1,239,887 | Cole | Sept. 11, 1917 |
| 1,726,319 | Shield | Aug. 27, 1929 |
| 2,410,814 | Evans | Nov. 12, 1946 |
| 2,522,248 | Blair | Sept. 12, 1950 |
| 2,607,600 | Trautman | Aug. 19, 1952 |
| 2,612,185 | Allen | Sept. 30, 1952 |
| 2,658,190 | Poitras | Nov. 3, 1953 |
| 2,673,270 | Manpoh | Mar. 23, 1954 |